United States Patent [19]
Henry et al.

[11] 4,456,334
[45] Jun. 26, 1984

[54] PROCESS FOR ALIGNING AN OPTICAL FIBER FORMING PART OF AN OPTICAL TRANSMISSION CABLE WITH AN OPTO-ELECTRONIC COMPONENT, AN ADAPTER, AND A COUPLING HEAD COMPRISING USE OF THE PROCESS

[75] Inventors: Raymond Henry; Jacques Simon; Danièle Levy; Jean-François Carpenter; Bernard Defaut, all of Paris, France

[73] Assignee: Thomson-CSF, Paris, France

[21] Appl. No.: 304,606

[22] Filed: Sep. 22, 1981

[30] Foreign Application Priority Data

Sep. 23, 1980 [FR] France .................. 80 20411

[51] Int. Cl.³ ............................................. G02B 7/26
[52] U.S. Cl. ................................ 350/320; 250/227; 350/96.20; 357/74
[58] Field of Search ............. 350/96.20, 96.21, 320; 250/227; 357/17, 19, 30, 74, 79, 80

[56] References Cited

U.S. PATENT DOCUMENTS

| | | | |
|---|---|---|---|
| 4,065,203 | 12/1977 | Goell et al. | 350/96.20 |
| 4,088,390 | 5/1978 | McCartney | 350/96.21 |
| 4,181,401 | 1/1980 | Jensen | 350/96.21 |
| 4,300,815 | 11/1981 | Malsot et al. | 350/96.20 |
| 4,362,360 | 12/1982 | Mannschke | 350/96.20 |

FOREIGN PATENT DOCUMENTS

| | | | |
|---|---|---|---|
| 2387517 | 11/1978 | France . | |
| 2446497 | 8/1980 | France | 350/96.20 |

*Primary Examiner*—John D. Lee
*Attorney, Agent, or Firm*—Oblon, Fisher, Spivak, McClelland & Maier

[57] ABSTRACT

A process allowing the centering of an optical fiber in an opto-electronic head or the fiber-holder of a head in an adapter between the head and optical cable. To this effect, a certain clearance is left between the cover of the head and the main part of the fiber-holder. Then a tool is used having micrometric screws for producing permanent deformations on the periphery of the cover made from a ductile alloy, while checking the result by "dynamically" effected measurements. In the case of a fiber-holder in an adapter, a certain clearance is left between the end of the fiber-holder on the cable side and the adapter is provided with a skirt made from a ductile alloy which is deformed at certain points in a manner similar to that of the first case.

8 Claims, 4 Drawing Figures

PROCESS FOR ALIGNING AN OPTICAL FIBER FORMING PART OF AN OPTICAL TRANSMISSION CABLE WITH AN OPTO-ELECTRONIC COMPONENT, AN ADAPTER, AND A COUPLING HEAD COMPRISING USE OF THE PROCESS

BACKGROUND OF THE INVENTION

The invention relates to a process for aligning a glass fiber forming part of an optical transmission cable with an opto-electronic component. Problems arise at two portions of prior art processes:

(1) At the transition of the light between an emitting or receiving diode and an optical fiber portion, also sometimes called "mixing fiber", situated in an opto-electronic head which forms a terminal point of the optical transmission cable.

(2) At the passing point between two optical fibers, particularly in the case of connection between an optical transmission cable and an opto-electronic head.

The need for very high precision in the alignment results from the following considerations, where the difficulties met with are also set forth.

The diameter of the glass fiber of the optical cable is often very small, i.e. for example 125 microns, and in addition the "core" of the fiber, the only part used for effective transmission, is for example 50 microns in so-called "telecommunication" fibers. It is then necessary to carry out the alignment within a few microns, if possible within two or three microns.

In an opto-electronic reception head, there is an incorporated fiber portion which may have a head diameter greater than 50 microns but the head must remain small with respect to the useful area of the semiconductor diode, which is itself very small in the case of very-high-frequency connections.

In an emitting opto-electronic head, the diameter of the core of the fiber portion must be at least equal to the diameter of the emitting surface of the light-emitting diode so as to collect all of the light. That is to say, its diameter may be very much less than 100 microns.

In the connection between a cable and a head, the optical fiber of the cable is centered in an end-piece whose external contour forms a reference surface for positioning the axis of the fiber. The fiber portion incorporated in the head is centered by means of a fiber-holder, itself incorporated in the head. Between the end-piece and the fiber-holder there exists an adapter.

Known solutions to the alignment problem use either very-high-precision mechanical constructions or a manual positioning system integrated with the connecting device. They are generally complex and expensive.

BRIEF SUMMARY OF THE INVENTION

The invention aims at simplifying the device used by producing, at one or more judiciously-chosen points on the opto-electronic head or the adapter, a small permanent deformation providing the desired adjustment.

In the case of the head alone, the process of the invention for aligning a glass fiber with an opto-electronic component in which the glass fiber is a fiber section incorporated in a fiber-holder forming part of the opto-electronic head, which fiber portion presents on the opto-electronic component side a flat input or output face for the light, and the component is a semiconductor diode fixed to a base and presenting a useful light-emission or reception surface, is characterized in that, with the head comprising, between the fiber-holder and the base, a permanently deformable part, external means are applied at the periphery of the deformable part, so as to exert pressures capable of producing one or more permanent deformations and by simultaneously checking the alignment of the flat face of the fiber section with the useful surface of the diode by means of the amount of light transmitted.

In the case of the connection between cable and head, the process of the invention for aligning a glass fiber with an opto-electronic component, in the case where the glass fiber forms the end of an optical transmission cable and where the component is an opto-electronic head, comprising a light-emitting or photoreceiving diode and an optical fiber portion included in a fiber-holder, itself forming part of the head, is characterized in that an adapter is formed comprising a first end for receiving the fiber and a second end for receiving the fiber-holder of the head, said adapter comprising between its ends a permanently deformable part and in that, means are applied at the periphery of the deformable part so as to exert pressures capable of producing one or more permanent deformations, while checking the alignment of the fiber with the fiber portion by means of the amount of light transmitted.

BRIEF DESCRIPTION OF THE DRAWINGS

The invention will be better understood and other characteristics will appear from the following examples and accompanying drawings in which.

DESCRIPTION OF THE PREFERRED EMBODIMENT

Figure 1:
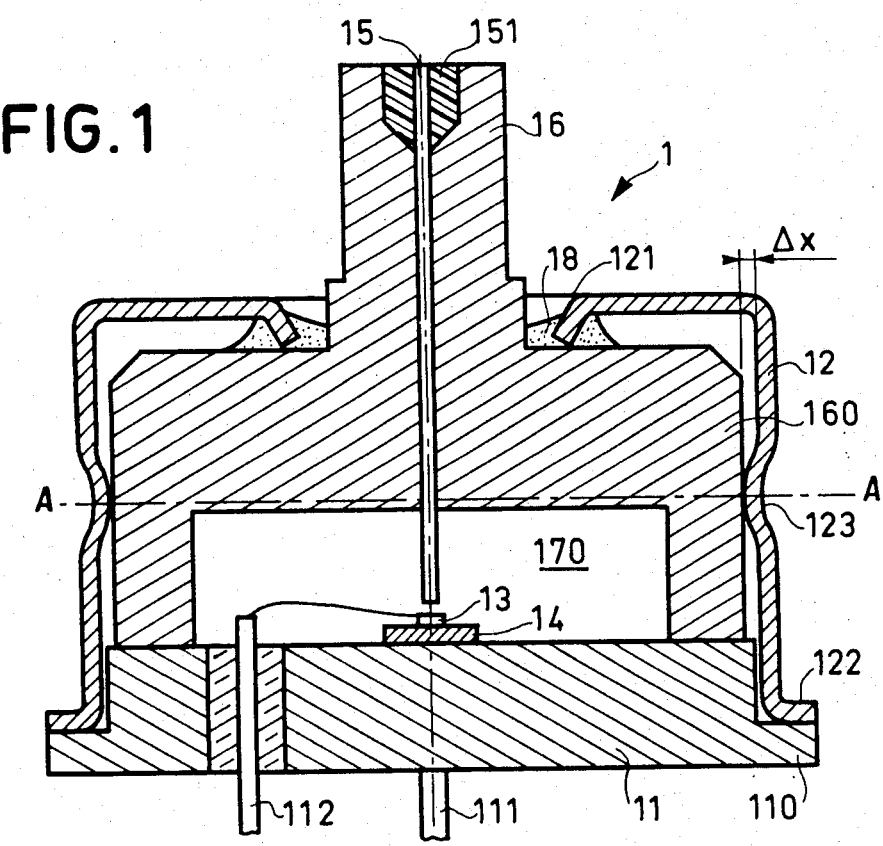
FIG. 1 is a schematical section of an opto-electronic head usable for carrying out the process of the invention.

In the diagram of FIG. 1, relative to an opto-electronic head, a case 1, of the standardized type for a semiconductor device, made from a ductile alloy (ferro-nickel for example), comprises a base 11, for example made from an iron, nickel and cobalt alloy, having a thermal expansion coefcient close to that of glass, and a metal cover 12. The base has passing therethrough insulating passages for electronic connections 111 and 112, of the "glass bead" type, for supplying the opto-electronic component of the head. In the case of FIG. 1, it is for example a question of a photodiode 13 mounted on a support 14. This latter is for example a ceramic wafer metalized on two opposite faces, or only on the face which receives the diode, the ground connection 111 being soldered to this latter metalized face.

In the same diagram, there is shown in FIG. 1, a fiber-holder 16 whose metal part comprises a shoulder 160 of a diameter slightly less than the internal diameter of the cover, a clearance $\Delta x$ being deliberately left between parts 160 and 12. The fiber-holder encompasses a fiber 15, secured against movement by bonding, resin or soldering, particularly at the upper part of the fiber-holder by a deposit 151. Shoulder 160 comprises a recess 170, thus providing a housing for the component and its connections, with a space for adjusting under the best conditions the coupling of the component and the output face (or input face in the case of a receiving head) of the optical fiber.

The upper part of the fiber-holder 16 emerges from the upper part of cover 12 through a central aperture whose edge 121 is inclined downwards. A deposit 18 of adhesive, resin or solder is deposited about the fiber-holder so as to seal the cover to shoulder 160. The step where this deposition is carried out will be described further on.

Furthermore, base 11 comprises a flange 110, of a smaller thickness than the central part, so as to facilitate the electric welding of the widened-out edge 122 of cover 12 to the periphery of base 11. This welding operation is described further on.

The process for manufacturing and mounting the fiber-holder and the head assembly comprises for example the following steps:

(a) manufacturing on the lathe of the fiber-holder, comprising more especially the machining of shoulder 160 and the boring of an axial orifice;

(b) fixing the fiber in the central aperture of the fiber-holder so as to place one of the end-faces of the fiber in the plane corresponding to the optimum coupling of this face and the opto-electronic component;

(c) lapping and polishing the upper part of the fiber-holder and of the fiber itself;

(d) stamping and boring the cover by using conventional means to which are added tools adapted to the dimensions of cover 12.

(e) permanent deformations 123 are produced at the level of a plane shown at AA in FIG. 1. To this end, a tool is used comprising a block 200 parallelepipedic or circular in shape comprising a central aperture having a diameter such that the part of cover 12 situated above edge 122 may be housed therein. Block 200 further comprises, at three or four points of its periphery, tapped holes each receiving a micrometric screw 201. In FIG. 1 there are shown substantially equivalent deformations of cover 12 under the effect of screws 201, which does not correspond to the general case where these deformations are different. In practice, these deformations may be produced by acting on the screws, while permanently checking the result obtained by "dynamic" tests, i.e. by effecting a real light transmission and measuring the quality of the transmission.

(f) finally cover 12 is sealed by using welding means comprising electrodes shaped so as to mate with the head.

A deposit 18, formed by previous insertion of a solder preform and partially melted during this step, finishes the sealing of the head.

The adjustment described in step (e) may be made automatic by subjecting the advance of the micrometric screws, in two directions situated at 90° from each other, to control by devices sensitive to the intensity of the electric signal detected in the case of a photodiode and of the light signal received at the end of the optical fiber in the case of a light-emitting diode.

Figure 3:
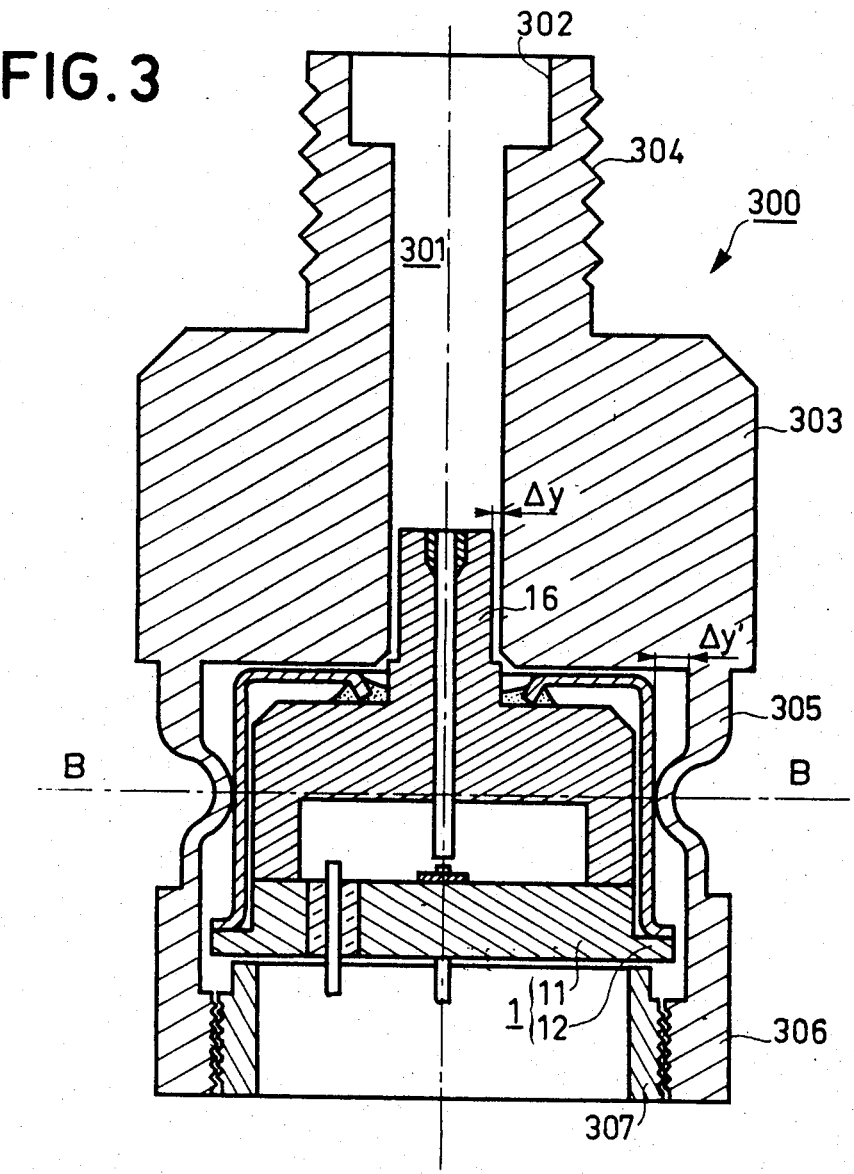
FIG. 3 is a longitudinal section of a connection device between cable and opto-electronic head, used in accordance with the process of the invention.

In FIG. 3, there is shown an opto-electronic head 1 which is similar but not necessarily identical to the one shown in FIG. 1. It comprises a cover 12 and a base 11. A fiber-holder 16, emerging from cover 12, is engaged in the chimney 301 of an adapter 300, while providing a certain clearance $\Delta y$, for example of the order of 30 to 60 microns. This adapter is designed for housing in its upper part head 1, and in the part opposite the fiber-holder 16, the end of an optical cable (not shown) without providing any play so that the optical fiber of the cable is exactly centered in chimney 301. This chimney 301 further comprises a widened portion 302 for housing either a cable end-piece or the end of the sheath of the cable in the case where this latter is stripped over a part of its length to facilitate insertion thereof into the adapter, or finally a deposit of a sealing material.

The adapter comprises a shoulder 303 surrounding chimney 301 and a threaded part 304 intended to receive a connection ring, in the case where the cable terminates in an end-piece which comprises such a ring. Furthermore, on the side opposite part 304, the adapter comprises a skirt 305 for surrounding head 1 with a clearance $\Delta y'$. The difference in the diameters of the adapter and the skirt is slightly greater than the difference in the diameters of the fiber-holder 16 and chimney 301.

A collar 306 terminates skirt 305. It is wide enough to let base 12 pass. A threaded ring 307 is screwed into the internal part of collar 306 so as to urge cover 12 against the lower part of shoulder 303.

The material used for manufacturing the adapter and more especially its deformable skirt may be formed by a nickel, copper and zinc alloy (with other additives) known commercially under the name ARCAP (Trademark for a nickel, copper and zinc alloy).

The process for manufacturing and mounting the fiber and its head in the adapter comprise the following steps:

(a) manufacture of the adapter, this latter comprising at least one axial aperture for housing on one side the cable, without any clearance, and on the other, with a certain clearance, the end of the fiber-holder of the opto-electronic head;

(b) boring the axial aperture of the adapter so as to provide sufficient clearance on the fiber-holder side for allowing the adjustment provided for in the following step (e);

(c) mounting the end on the adapter while making sure that there is no mechanical play between the cable or its end-piece and the internal wall of the adapter;

(d) mounting the head while securing it against movement in the adapter by means of the threaded ring thereof;

(e) adjustment, with "dynamic" checking of the alignment of the optical fibers of the cable and of the head while producing durable deformations of the skirt of the adapter, at the level of a plane shown at BB in FIG. 3, perpendicular to the axis of revolution of the fiber-holder and meeting this latter in its most massive part.

Figure 2:
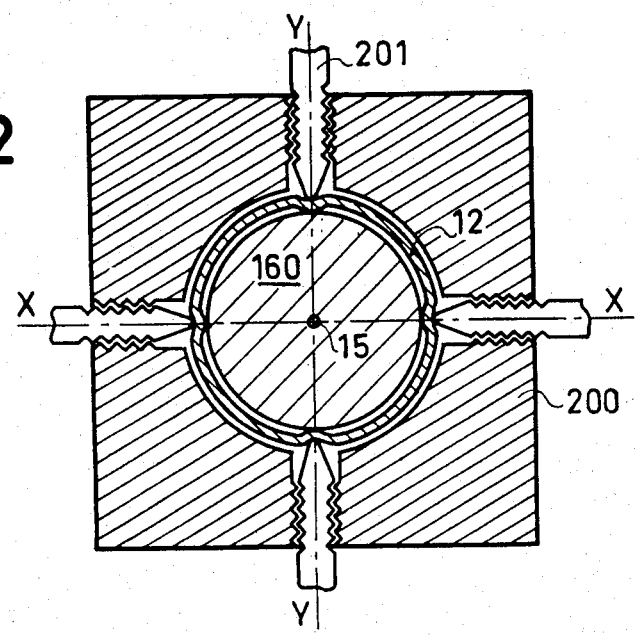
FIG. 2 shows in schematical section an adjustable device usable in carrying out the process of the invention.

A device similar to the one described in connection with FIG. 2 may be used.

Figure 4:
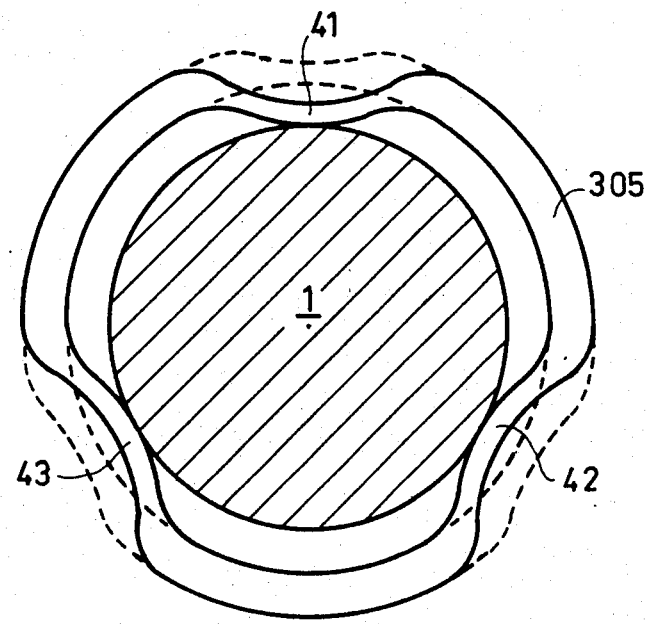
FIG. 4 is a cross-section of the preceding device.

There may also be provided, in manufacturing the adapter, thinner portions 41, 42 and 43 in the wall of skirt 305. There is shown, in FIG. 4, points of lesser thickness situated at 120° from each other on the circle of the section of skirt 305. Four such thinner portions may also be provided disposed along two diameters at 90°.

What is claimed is:

1. In a process for aligning a glass fiber with an opto-electronic component in a case where the glass fiber is a fiber portion incorporated in a fiber-holder forming part of an opto-electronic head, which fiber portion presents, on the opto-electronic component side, a flat input or output face for the light, and said component is a semiconductor diode fixed to a base and presenting a useful light-emission or reception surface, the improvement comprising the steps of:

forming said head with a permanently deformable part between said fiber-holder and said base;

applying external means at the periphery of said deformable part, while exerting pressures capable of producing permanent deformations and simultaneously checking the alignment of the flat face of the fiber section with the useful surface of the diode by means of the amount of light transmitted.

2. In a process for aligning a glass fiber with an opto-electronic component, in the case where the glass fiber forms the end of an optical transmission cable and where the component is an opto-electronic head comprising a photoemittant or photoreceiving diode and an optical fiber portion included in a fiber-holder, itself forming part of the head, the improvement consisting in forming an adapter comprising a first end for receiving the optical fiber and a second end for receiving the fiber-holder of the head, said adapter comprising between its ends a permanently deformable part, and in applying, at the periphery of the deformable part, external means so as to exert pressures capable of producing permanent deformations, while checking the alignment of the fiber with the fiber portion by means of the amount of light transmitted.

3. The process as claimed in claim 1, wherein the deformable part of the opto-electronic head included between the fiber-holder and the base is formed by the periphery of a cover made from a ductile alloy, a clearance being provided between the cover and fiber-holder at the level of the part intended to receive permanent deformations.

4. The process as claimed in claim 2, wherein the deformable part of the adapter is a skirt made from a ductile alloy and presents thinned-down parts at predetermined points, a clearance being provided between the skirt and opto-electronic head at the level of the thinned-down parts.

5. The process as claimed in any one of claims 1 and 2, wherein a tool is used comprising three or four micrometric screws surrounding the parts where it is desired to produce permanent deformations.

6. The process as claimed in claim 5, wherein the micrometric screw adjustments in two directions situated at 90° from each other are controlled by a signal obtained by the step of checking.

7. An opto-electronic head manufactured by the process as claimed in claim 1, wherein the deformable part of the head has undergone one or more permanent deformations on its periphery.

8. An adapter between an optical cable and an opto-electronic component, of the type manufactured by means of a process as claimed in claim 2, wherein said adapter further comprises a skirt deformable at predetermined points of its periphery, said skirt being capable of housing the component and means being provided for clamping the component in its housing.

* * * * *

UNITED STATES PATENT AND TRADEMARK OFFICE
CERTIFICATE OF CORRECTION

PATENT NO. : 4,456,334
DATED : June 26, 1984
INVENTOR(S) : Henry et al.

It is certified that error appears in the above-identified patent and that said Letters Patent is hereby corrected as shown below:

On the title page Item [75] Inventors: should read:

- - [75] Raymond Henry; Jacques Simon; Daniele Levy; Jean-Francois Carpentier; Bernard Defaut, all of Paris, France - -

Signed and Sealed this

Nineteenth Day of February 1985

[SEAL]

Attest:

DONALD J. QUIGG

*Attesting Officer*   *Acting Commissioner of Patents and Trademarks*